L. TOWNSEND.
AUTOSLEIGH.
APPLICATION FILED JULY 3, 1914.
1,125,604.
Patented Jan. 19, 1915.
2 SHEETS—SHEET 1.
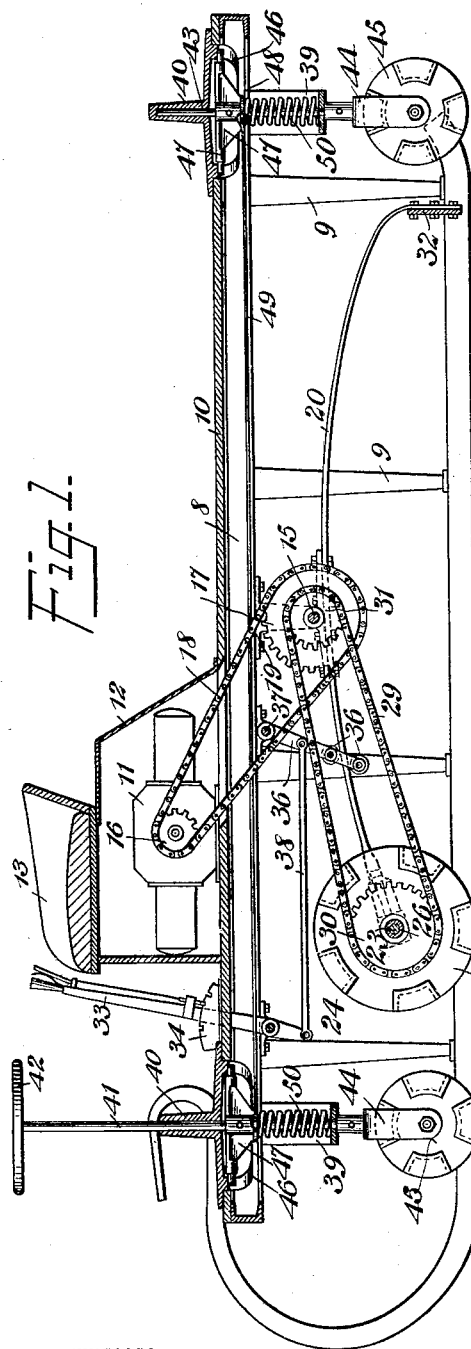
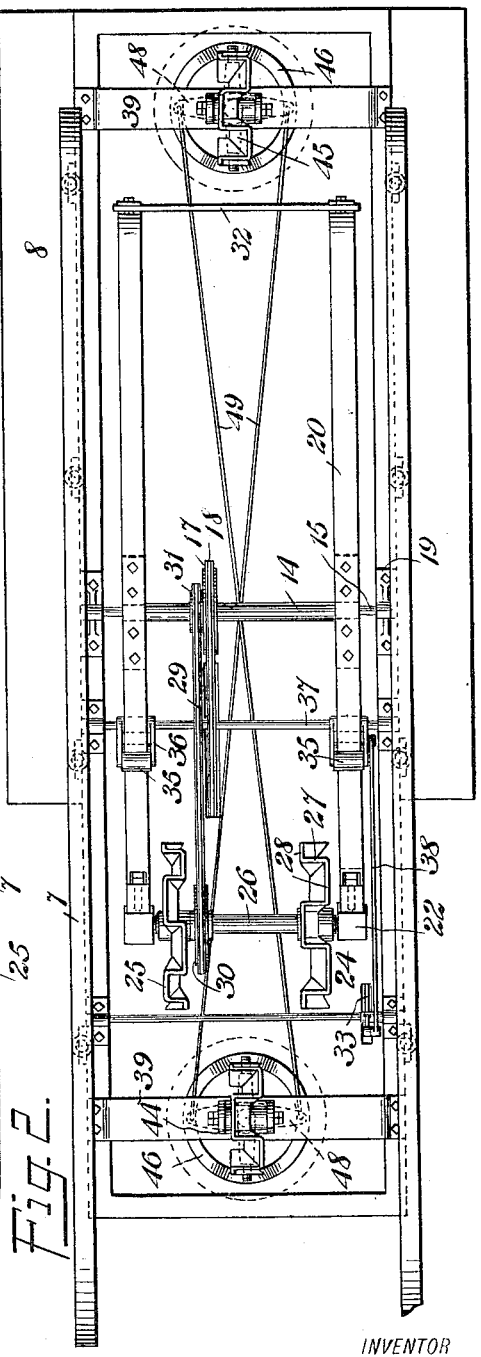
WITNESSES
George L. Blume.
INVENTOR
Louis Townsend
BY Munn & Co.
ATTORNEYS L. TOWNSEND.
AUTOSLEIGH.
APPLICATION FILED JULY 3, 1914.
1,125,604.
Patented Jan. 19, 1915.
2 SHEETS—SHEET 2.
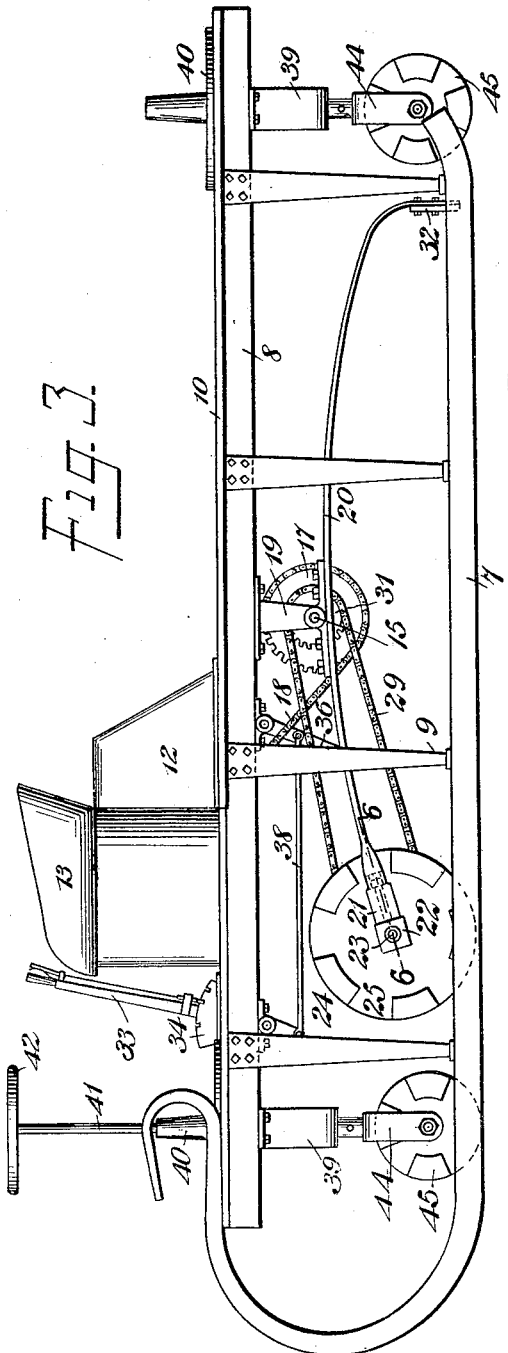
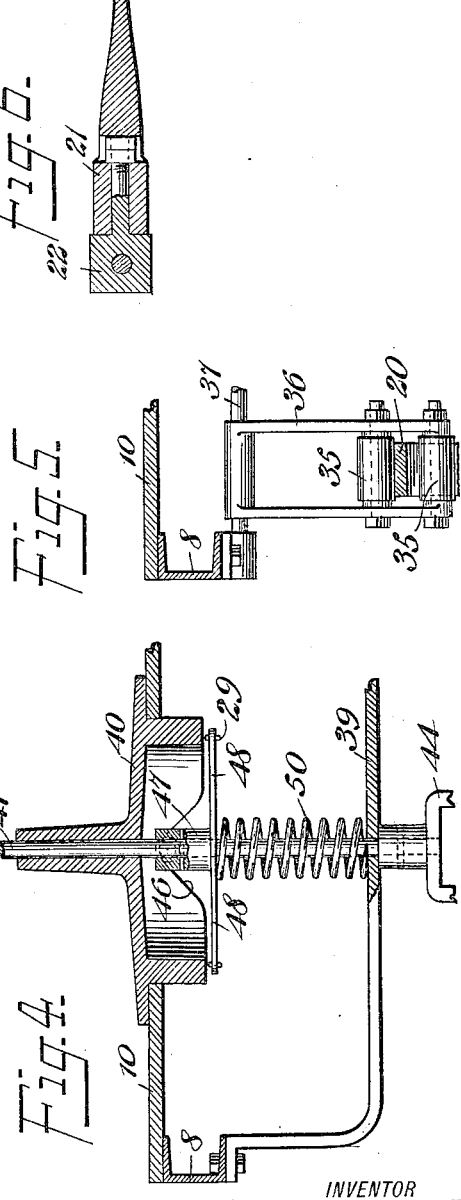
WITNESSES
George L. Blume.
INVENTOR
Louis Townsend
BY
ATTORNEYS

UNITED STATES PATENT OFFICE.

LOUIS TOWNSEND, OF EVANSVILLE, INDIANA, ASSIGNOR OF ONE-HALF TO GEORGE SCHMITT, SR., OF EVANSVILLE, INDIANA.

AUTOSLEIGH.

1,125,604.  Specification of Letters Patent.  Patented Jan. 19, 1915.

Application filed July 3, 1914. Serial No. 848,746.

*To all whom it may concern:*

Be it known that I, LOUIS TOWNSEND, a citizen of the United States, and a resident of Evansville, in the county of Vanderburg and State of Indiana, have invented a new and Improved Autosleigh, of which the following is a full, clear, and exact description.

My invention relates to auto-sleighs, and an object thereof is to provide a simple, strong and inexpensive sleigh which is easily controllable and in which the traction wheels are so arranged as to prevent sliding sidewise.

Another object of the invention is to provide a sleigh in which the means for guiding the sleigh are adapted to relieve the weight of the sleigh from the runners during the turning of the sleigh.

A further object of the invention is to provide a sleigh having means whereby the sleigh can be stopped quickly, said means becoming operable when the traction wheel is rendered inoperative.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a longitudinal section of an auto-sleigh embodying my invention; Fig. 2 is a plan view of the sleigh bottom upward; Fig. 3 is a side elevation of the sleigh; Fig. 4 is an enlarged sectional view of the steering mechanism; Fig. 5 is a detail view of the friction rollers controlling the movement of the traction wheels and the brake; and Fig. 6 is a section on line 6—6, Fig. 3.

Referring to the drawings, 7 represents the runners of the sleigh which carry thereon the chassis or frame 8 secured rigidly to the runners by means of stays 9, which properly space the chassis from the runners. The runners 7 at the front of the sleigh bend toward the chassis to a shape customary in the construction of sleighs. Secured firmly to the chassis is a bed 10 on which a motor 11 is mounted adjacent the front of the sleigh. The motor is preferably inclosed in a casing 12 on which a seat 13 is suitably mounted so that the heat of the engine can be utilized to warm the seat.

The power from the engine 11 is transmitted to a transmission shaft 14 by means of sprockets 16 and 17 and an endless chain 18, but any other suitable transmission can be used if desired. The transmission shaft 14 is preferably tubular and mounted to bear on a stationary rod 15 which extends transversely of the chassis between the chassis and the runners and is secured to the chassis by suitable brackets 19.

Mounted to rock on the rod 15, on each side of the transmission shaft 14, is an elongated resilient member 20. It is self-evident that the elongated resilient member 20 can be made to rock on a different member than the rod 15 if desired. The forward end of each of said members 20 is provided with a socket 21 integral therewith or rigidly secured thereto by any suitable means. Mounted to swivel longitudinally in the sockets 21 are bearing blocks 22. Bearing in said blocks is a shaft 23 which carries the traction member 24 formed of two disks or wheels 25 united by a sleeve 26, preferably formed integral with said disks. The sleeve 26 may be keyed to the shaft 23, or, if desired, the shaft 23 may be made stationary and the sleeve 26 made to bear thereon.

The disks forming the traction member each have radially directed transverse ribs 27 symmetrical with the plane of the wheel and connected at opposite sides by oppositely directed ribs 28 disposed in planes parallel to the planes of the wheel, said ribs 27 and 28 forming U-shaped channels at the periphery of the disk, the bottom and sides of which channels slope from the axis of the wheel to the periphery thereof. This convergency of the sides of the channels formed by the ribs facilitates the cleaning of said channels from the ice and snow which they engage during the movement of the sleigh. The transverse ribs 27 are the pulling ribs, while the side ribs 28 are intended to hold the sleigh from skidding sidewise. The two wheels 25 have their U-shaped channels staggered, that is to say, the transverse ribs 27 of one wheel would fall between the transverse ribs 27 of the other wheel. This provision produces a better traction member, as there is always about three ribs 27 in action. The traction member 24 is actuated from the transmission shaft 14 by means of an endless chain 29 engaging sprocket wheels 30 and 31 provided on the traction member 24 and the transmission shaft 14 respectively. It is evident that any other suitable means of transmission from the transmission shaft to the traction member can be provided.

The rear ends of the resilient member 20 are united by a bar 32 disposed transversely of the sleigh to form a scraper adapted to engage the snow when the rear ends of the spring are lowered. This scraper forms the brake for the sleigh whereby the same may be quickly stopped. The traction member 24 and the scraper 32 carried by the resilient members 20 are so positioned thereon that when the said resilient members are maintained in neutral position by an operating lever 33 both the traction member and the scraper are above the bottom of the runner 7, i. e., they do not contact with the snow. The operating or controlling lever 33 is positioned near the seat 13, a sector 34 being provided therefor to maintain said lever in predetermined positions.

Engaging each of the resilient members 20, between the traction member 24 and the rod 15, are friction rollers 35 engaging the opposite faces of the said resilient members, said friction rollers 35 being carried by a bracket 36 rigidly secured to a shaft 37 mounted in bearings carried by the underside of the chassis 8. A rod 38 connects one of the brackets 36 to the operating lever 33. By moving the lever from the seat, the traction member 24 is forced toward the ground, i. e., into operative position. The movement of the traction member to the operative position causes the opposite end of the resilient members 20 to move toward the chassis, thus raising the scraper or brake away from the ground. An inverse movement of the lever will raise the traction member from the ground, that is, place the same into inoperative position, forcing the brake or scraper 32 into engagement with the ground, i. e., into operative position. As shown in Fig. 1, the lever is in neutral position, and both the traction member and the scraper are in inoperative position.

The chassis 8 in the front and rear thereof is provided with brackets 39 disposed transversely underneath the chassis. Positioned on the longitudinal central line of the bed 10 adjacent each end thereof are supports 40, the front one being in alinement with the bracket 39 at the front of the chassis, and the rear one in alinement with the rear bracket. Bearing in the front support 40 and the corresponding bracket 39 is a vertical shaft 41, the upper end of which projects out of the support 40 and thereat is provided with a steering wheel 42, said shaft and wheel being so positioned as to be easily manipulated from the seat 13. A shaft 43 is also mounted to bear in the rear support 40 and the corresponding bracket 39. The lower ends of the shafts 41 and 43 project out of the brackets 39 and thereat each is provided with a bifurcated member 44. Rotatably mounted in each of the bifurcated members is a directing wheel 45, said wheels 45 being similar to the traction wheels 25 but of a smaller diameter. The underside of the bottom of each of the supports 40 forms a cam face 46 engaged by a member 47 rigidly secured to the shafts 41 and 43 respectively. The member 47 has diametrically opposite, laterally extending arms 48 normally disposed transversely of the chassis. The said arms 48 of the front member 47 are connected to the arms 48 of the rear member 47 by crossing rods 49. The engagement of the members 47 with the cam surface 46 is maintained by a coil spring 50 positioned between the bottom of the bracket 39 and the member 47 and engaged by their respective shafts 41 and 43. The tendency of said springs 50 is to force the directing wheel 45 away from the ground. By turning the steering wheel 42, the members 47 are caused to move on the cam surface 46. This movement of the member on the cam surface causes a downward movement of the shafts 41 and 43 respectively, bringing the corresponding wheels 45 in engagement with the ground, whereby the runners are cleared from the ground, the sleigh being carried during the steering of the same by the steering wheels 45. This permits a quick and easy steering, as no traction action by the runners can exist, the same being cleared from the snow.

From the above description it will be seen that in my auto-sleigh the transverse ribs 27 represent positive driving means, while the side ribs prevent any side slipping of the sleigh. The resilient suspension of the traction wheels greatly reduces the shocks that may be caused by the unevenness of the ground on which the sleigh moves and which is further overcome by the provision of the bearings 22 mounted to swivel in the end of the resilient member. The brake for the sleigh, which is also associated with the resilient members, is only operable in conjunction with the traction members and prevents the application of the brake while the traction members are in operative position.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. In an auto-sleigh, a frame, a resilient member mounted to rock on said frame, a traction member associated with said resilient member, a scraper forming a brake for the sleigh associated with said resilient member, and means for rocking said resilient member whereby said brake and traction member can be maintained in predetermined positions.

2. In an auto-sleigh, a frame, a traction member for propelling the sleigh, a brake for the sleigh, and means associated with the traction member and brake whereby when the traction member is placed into operative position the brake is moved into inoperative position, and vice versa.

3. In an auto-sleigh, a frame having runners, elongated resilient members mounted to rock on said frame, a traction member associated with one end of said elongated members, a brake associated with the other end of the elongated members, friction rollers engaging said elongated members adjacent the traction member, and a controlling lever associated with said friction rollers whereby the rocking movement of said elongated members is controlled substantially as and for the purpose set forth.

4. In an auto-sleigh, a frame having runners spaced therefrom, elongated resilient members mounted to rock on said frame between the runners and the frame, a traction member associated with the forward ends of said resilient members, a bar connecting the rear ends of said resilient members, brackets pivotally mounted on said frame, frictional rollers carried by said brackets, said friction rollers engaging the opposite faces of said elongated resilient members adjacent the traction member, and a controlling member associated with the bracket whereby the rocking movement of said elongated resilient members is controlled.

5. In an auto-sleigh, a frame having runners spaced therefrom, an engine on the frame, a transmission shaft below the frame, elongated resilient members mounted to rock adjacent said transmission shaft, a traction member carried by the forward ends of said elongated members, means for transmitting the movement from the transmission shaft to said traction member, a bar connecting the rear ends of said resilient members, brackets pivotally mounted on said frame, friction rollers carried by said brackets and adapted to engage the opposite faces of said resilient members, the engagement of said rollers with the resilient member being between the transmission shaft and the traction member, a controlling lever associated with the brackets whereby the same can be moved on their pivot and whereby the rocking movement of said resilient members is controlled, and means for steering the wheel.

6. In an auto-sleigh, a frame having runners, a traction member, a brake, means for simultaneously operating the traction member and the brake so that when one is moved into engagement with the ground the other is moved away therefrom, and a steering mechanism for the sleigh normally clear of the ground, said steering mechanism having means adapted to clear the runners from the ground when steering the sleigh.

In testimony whereof I have signed my name to this specification in the presence of two subscribing witnesses.

LOUIS TOWNSEND.

Witnesses:
WILLIAM S. HEURICH,
SEBASTIAN HEURICH.

Copies of this patent may be obtained for five cents each, by addressing the "Commissioner of Patents, Washington, D. C."